Feb. 16, 1971   J. A. CATHERALL   3,564,575
PISTONS
Filed March 5, 1969   3 Sheets-Sheet 1
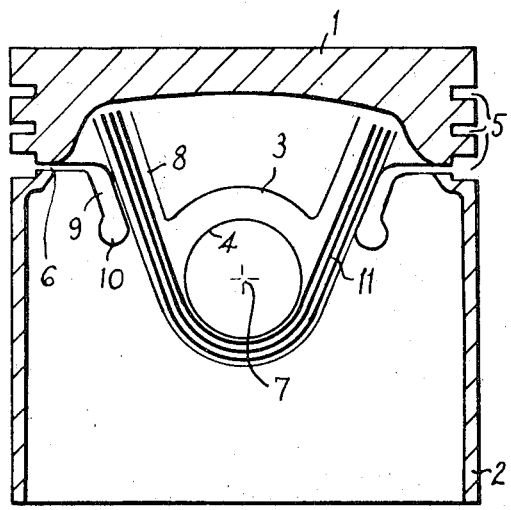
Fig.1
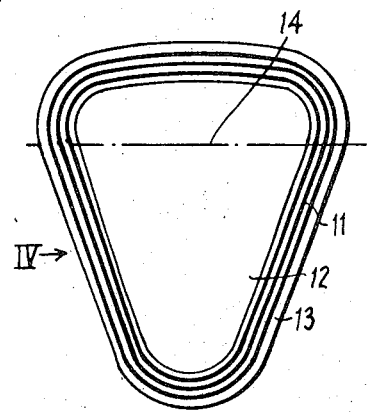
Fig.3
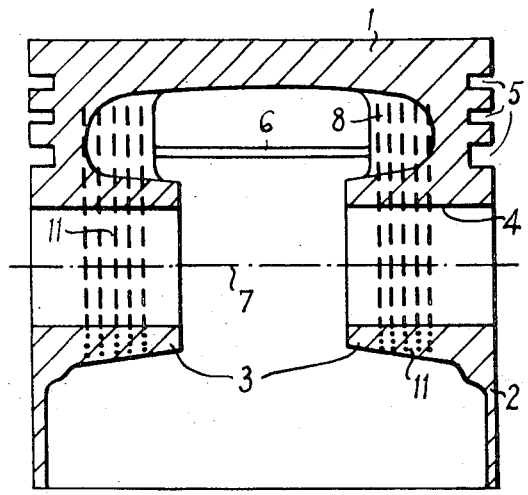
Fig.2
Fig.4

United States Patent Office 3,564,575
Patented Feb. 16, 1971

3,564,575
PISTONS
John Anthony Catherall, Leamington Spa, England, assignor to Associated Engineering Limited, Warwickshire, England, a company
Filed Mar. 5, 1969, Ser. No. 804,459
Claims priority, application Great Britain, Mar. 15, 1968, 12,834/68
Int. Cl. F16j 1/04
U.S. Cl. 92—230                                    14 Claims

ABSTRACT OF THE DISCLOSURE

The present invention relates to pistons and to methods for their manufacture. According to the invention a piston includes filamentary reinforcement provided at least in the region of the or each gudgeon pin bore. The filamentary reinforcement may extend from the region of or adjacent to the piston crown to the region of the or each gudgeon pin bore.

---

This invention relates to pistons, and to methods for their manufacture.

From one aspect, the invention provides a piston including filamentary reinforcement at least in the region of the or each gudgeon pin bore.

From another aspect, the invention provides a piston including filamentary reinforcement extending from the region of or adjacent to the piston crown to the region of the or each gudgeon pin bore.

The reinforcement may be continuous, and may have a generally U or V formation; or it may be discontinuous. Materials for the filamentary reinforcement include suitable metal wires, including for example stainless steel wire, carbon steel wire, tungsten, molybdenum, nickel alloy, or berryllium wire; or fibres, for example asbestos, glass or silica fibres. Stainless steel wire may be used where the body of the piston is of aluminium or magnesium alloy; and refractory metal wires, such as tungsten and molybdenum, may be used where the body of the piston is of steel.

The invention also provides a method of manufacturing a piston, which includes the steps of positioning filamentary reinforcement on a mandrel, covering said reinforcement with material which is capable of being united with the piston body, and incorporating one or more of the resulting composite reinforcements in said piston so as to extend at least in the region of the or each gudgeon pin bore.

A number of embodiments of piston and their method of manufacture will now be described, by way of example, with reference to the accompanying drawings, in which:

FIG. 1 is a cross-section of a first embodiment of piston,

FIG. 2 is a cross-section of the piston of FIG. 1 taken in a plane at right angles to the section of FIG. 1, FIG. 3 illustrates part of a stage in the manufacture of the piston of FIGS. 1 and 2, FIG. 4 is a view on arrow IV in FIG. 3.

Figure 5:
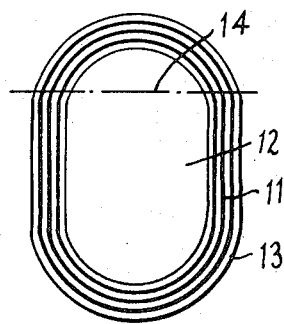
FIG. 5 is a view similar to FIG. 3 of a modification.

Referring to FIGS. 1 and 2, the piston has a crown 1, a skirt 2, and gudgeon pin bosses 3 providing a gudgeon pin bore 4. It is shown as having three piston ring grooves 5, e.g. two compression ring grooves and a scraper ring groove. Opening into the scraper ring groove are a pair of transverse part-circumferential slots 6, one at each side of the gudgeon pin axis 7. Each of the slots 6 extends over an arc of about 100°. Supporting webs 8 are provided which connect each gudgeon pin boss 3 to the underside of the crown 1.

A longitudinal slot 9 is provided at each end of each part-circumferential slot 6, extending away from the crown to a point level with the upper part of the gudgeon pin boss 3, and parallel or substantially parallel to the adjacent web 8. Each slot 9 has at its end remote from the crown 1 an enlargement 10 of width approximately double that of the longitudinal slot 9. The margins of the slots 9 may be strengthened by short lateral webs (not shown) extending from adjacent the slots 9 to the gudgeon pin bosses 3.

The piston as so far described may be as disclosed in British Patent 946,733.

It will be seen that in this embodiment, a pair of webs 8 and part of the connecting gudgeon pin boss 3 forms a V-shape, with a rounded apex. The piston is made of a light alloy, e.g. aluminium or magnesium alloy, and this V-shape portion has incorporated in it a filamentary reinforcement consisting of stainless steel wires 11, which extend from the region of the crown 1, or from a region adjacent the crown 1, and around the gudgeon pin bore 4.

The piston just described is manufactured in the following manner.

Referring to FIGS. 3 and 4, stainless steel wire 11 is wound on an elongated mandrel 12 of a cross-section appropriate to give the required disposition of the reinforcement, as described elsewhere in this specification. The wire 11 is then sprayed, either by flame spraying or plasma spraying techniques, with molten aluminium, so that the winding is covered as at 13, and is bonded together by the aluminium matrix. The composite of wire and aluminium is then cut off to the appropriate axial length (i.e. as shown in FIGS. 2 and 4) and hot-pressed at, for example, a pressure of 5 tons/sq. in. and a temperature of 300° C., to remove any porosity, and to give the required axial dimension. The composite is also parted off as indicated by line 14, to give the required V-shape. After removal from the mandrel, the composite is preferably cast into the piston by being incorporated in the die or mould before the metal is poured.

In a modification, the composites may be formed so that they may be inserted in suitable slots in the side walls of the piston casting, axially of the gudgeon pin bore, and may then be electron beam welded to the body of the casting.

In either case, the piston is then machined after insertion of the composite, to form the gudgeon pin bore, the ring grooves, and the outer surface of the piston.

It will be evident that the filamentary reinforcement need not be of V-shape; for example where the webs 8 are substantially tangential to the diameter of the gudgeon pin boss 3, the reinforcement will be of substantially U-shape (FIG. 5) and formed as just described.

Figure 6:
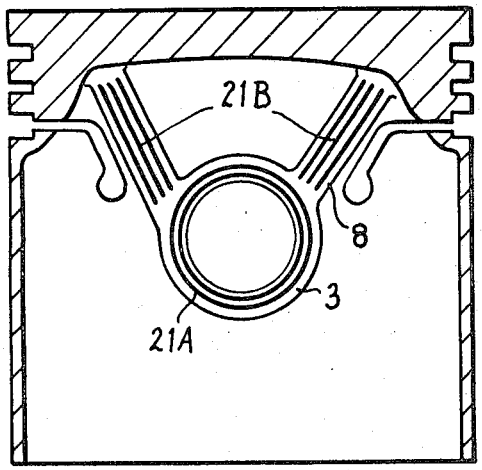
FIGS. 6 to 8 are views similar to FIG. 1 illustrating three further embodiments.

In the modification illustrated in FIG. 6, the webs 8 are substantially radial to the gudgeon pin boss 3. In this case the reinforcement may be in three separate sections at each gudgeon pin boss, namely one circular section 21A and two linear sections 21B. The circular section 21A will be formed as described above, using a circular mandrel and the linear sections will be formed by using a flat plate over which the wires are stretched, instead of a mandrel. The sections 21A and 21B may be united, e.g. by electron beam welding, before insertion in the piston. In an alternative arrangement the sections 21B may be used without the section 21A, or vice versa.

Figure 7:
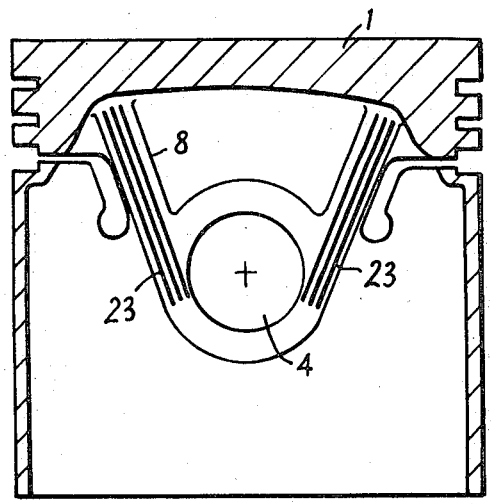

FIG. 7 shows a further embodiment of piston generally similar to FIG. 1, but wherein the filamentary reinforcement 23 is provided only along the length of each supporting web 8 from adjacent the piston crown to the opposite sides of the gudgeon pin bore 4.

Figure 8:
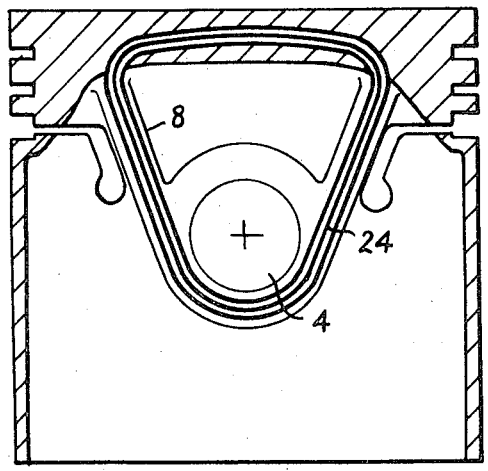

In the embodiment of FIG. 8, the filamentary reinforcement 24 is of somewhat similar form to that shown in FIG. 3 and is incorporated in the piston body so that the upper part thereof extends through the underside of the crown. The sides of the reinforcement extend through the webs 8 and the lower part of reinforcement extends through the lower part of the gudgeon pin bosses 3.

In a further embodiment, the filamentary reinforcement may be generally as shown in FIG. 1, but of "keyhole" configuration as seen in that view; in other words the wires 11 extend around more than half the circumference of the gudgeon pin boss, say 270°, and then diverge outward along the lines of the webs 8.

Instead of the composite being formed by spraying the filamentary reinforcement with the matrix material, e.g. aluminium alloy, it may be formed by, for example, surrounding the reinforcement with powdered matrix material and sintering the powder, or alternatively by the hot pressing of, for example, aluminium-coated wires to cause the aluminum to coalesce to form the matrix.

It will be understood that in FIGS. 2 and 4, the filaments 11 are continuous, and are shown in dashed lines only because, in these views, they are not visible on the surface of the section or elevation. Where the filamentary reinforcement is in the form of wires it will usually be continuous (at least in each section), whereas fibres, which are often only available in short lengths, may be in the form of a matt of overlapping generally-aligned fibres.

Although the filamentary reinforcement has been described as of stainless steel wire in the above embodiment, it may be of any other suitable filamentary material. Moreover, the piston need not necessarily be of light alloy, but pistons of other materials may be constructed in accordance with the invention.

The invention has particular application to pistons having part-circumferential slots such as the slots 6, for example to pistons as described and claimed in British Pat. No. 946,733.

I claim:
1. A piston including
   a crown;
   a skirt;
   at least one gudgeon pin boss of metal provided with a gudgeon pin bore;
   a metal matrix incorporating filamentary reinforcing means and said metal matrix being united with the metal of said gudgeon pin boss.

2. A piston as claimed in claim 1, wherein the filamentary reinforcement extends around the or each gudgeon pin bore.

3. A piston as claimed in claim 1, wherein the filamentary reinforcement extends from the region of or adjacent to the piston crown and around at least that part of the or each gudgeon pin bore remote from the piston crown.

4. A piston as claimed in claim 1, wherein the filamentary reinforcement also extends through the underside of the piston crown.

5. A piston as claimed in claim 1, wherein supporting webs are provided which connect the or each gudgeon pin boss to the underside of the piston crown and filamentary reinforcement extends through each web.

6. A piston as claimed in claim 1, wherein the filamentary reinforcement is composed of at least two separate sections.

7. A piston as claimed in claim 1, wherein the filamentary reinforcement is formed from at least one metal wire.

8. A piston as claimed in claim 1, wherein the filamentary reinforcement is formed from fibres.

9. A piston as claimed in claim 7, wherein the piston body is made of an aluminium or magnesium alloy and the reinforcement consists of at least one stainless steel wire.

10. A piston as claimed in claim 7, wherein the piston body is made of steel and the filamentary reinforcement consists of at least one refractory metal wire, such as tungsten or molybdenum wire.

11. A method of manufacturing a piston which includes the steps of positioning filamentary reinforcement on a mandrel, covering said reinforcement with a material which is capable of being united with the piston body, and incorporating at least one of the resulting composite reinforcements in said piston so as to extend at least in the region of the or each gudgeon pin bore.

12. A method as claimed in claim 11, wherein the filamentary reinforcement comprises at least one wire which is wound on a mandrel and then sprayed by a flame spraying or plasma spraying technique with a molten metal compatible with the metal of the piston, so that the winding or windings are covered by said metal and bonded thereto, whereafter said composite reinforcement is hot pressed and cut to size if necessary, and removed from the mandrel.

13. A method as claimed in claim 11, wherein at least one of said composite reinforcements are incorporated in a die or mould in which the piston is to be cast, so that the piston is cast around the or each composite reinforcement.

14. A method as claimed in claim 11, wherein at least one of said composite reinforcements are inserted in slots in the piston casting and are then electron beam welded to the casting.

References Cited
UNITED STATES PATENTS
3,000,676  9/1961  Cheney et al. _____ 92—230

MARTIN P. SCHWADRON, Primary Examiner

R. R. BUNEVICH, Assistant Examiner

U.S. Cl. X.R.
92—228; 29—156.5